Patented Feb. 10, 1931

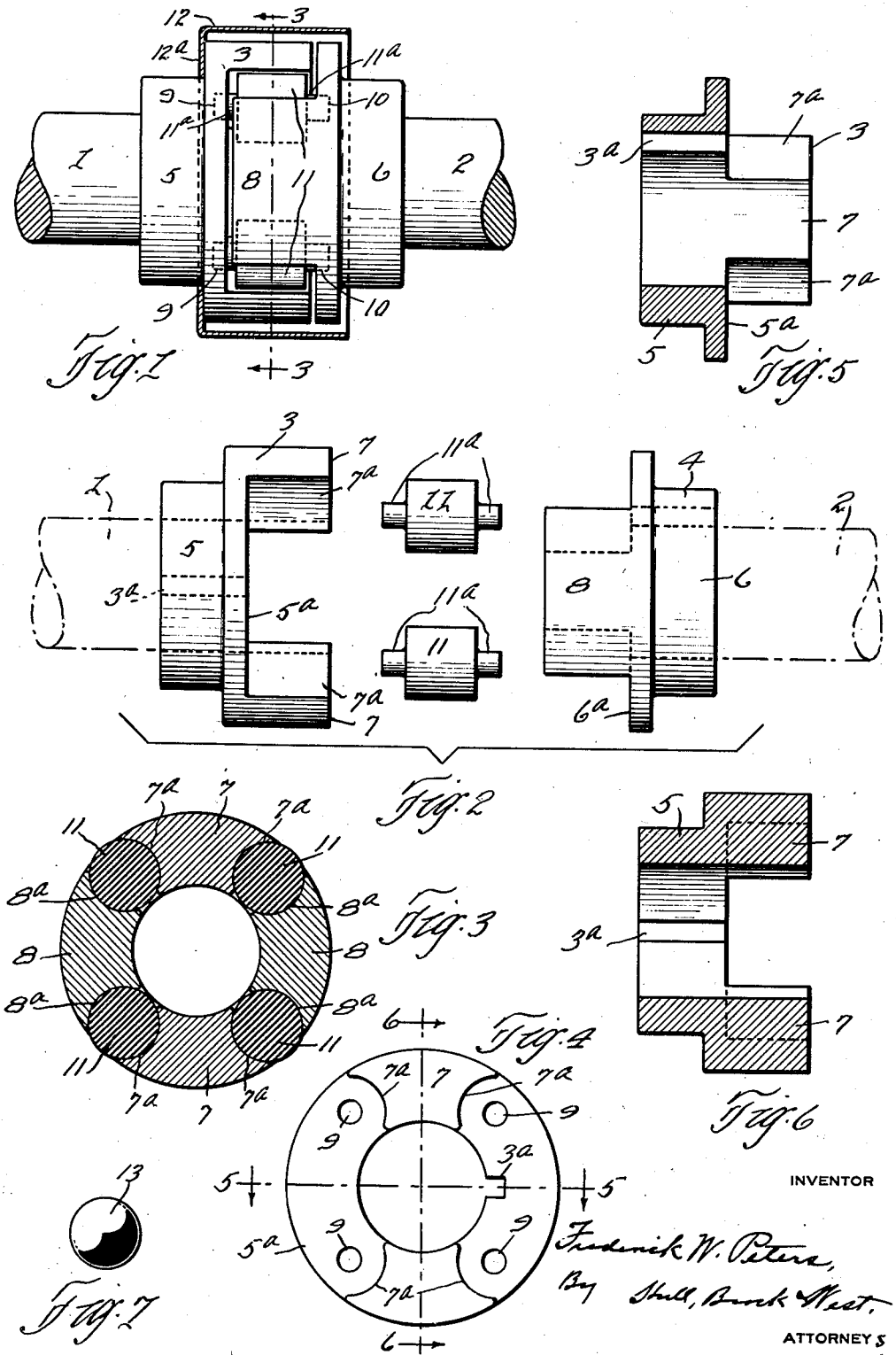

1,791,763

UNITED STATES PATENT OFFICE

FREDERICK W. PETERS, OF CLEVELAND, OHIO, ASSIGNOR TO THE AL-METAL UNIVERSAL JOINT COMPANY, OF CLEVELAND, OHIO, A CORPORATION OF OHIO

FLEXIBLE COUPLING

Application filed May 2, 1929. Serial No. 359,766.

This invention relates to flexible couplings of the universal-joint type, and has for its general object to provide a coupling of this character which is extremely simple and economical of production; which will embody effective means for cushioning impacts between the members of said couplings, due to sudden rotary impulses imparted by one of such members to the other.

A further object of the invention is to provide a device of this character which, while embodying the advantages referred to hereinbefore, is economical of production and is efficient in operation through an extended period of time.

I accomplish the foregoing objects in and through a connection of the type shown in the drawing, wherein Fig. 1 represents a side elevation of a coupling embodying my invention, showing its application to a pair of shaft sections, the cover for the coupling being shown in section; Fig. 2 a side elevation of the parts comprising the coupling proper, showing the same in spaced relation; Fig. 3 a sectional view corresponding to the line 3—3 of Fig. 1, the cover being omitted; Fig. 4 an end elevation of one of the main coupling members; Figs. 5 and 6 details in section corresponding respectively to the lines 5—5 and 6—6 of Fig. 4; and Fig. 7 an elevation of a modified form of cushioning member.

Describing the various parts by reference characters and in connection with Figs. 1–6 inclusive, 1 and 2 denote shaft sections to which my flexible coupling is applied. The coupling comprises generally a pair of main coupling members 3 and 4 secured to the shaft sections 1 and 2 as by means of keyways formed in the hubs 5 and 6 respectively of said members and receiving keys or splines projecting from the respective shaft sections. Each of the members 3 and 4 comprises, in addition to its hub 5 or 6, a pair of segmental jaws 7—7 and 8—8, respectively. The jaws are arranged diametrically opposite each other on each coupling member. Each jaw is somewhat less than 90° in angular extent, and each jaw is provided in each lateral face thereof with a cylindrical recess $7^a$, $8^a$, respectively, the recesses extending preferably the full depth of each jaw. Each of the main coupling members is provided in its hub flange $5^a$, $6^a$, with cylindrical recesses 9 and 10, respectively, the said recesses being located adjacent to the surfaces $7^a$, $8^a$, respectively, and each having its axis coincident with the axis of the cylindrical surface $7^a$, $8^a$, adjacent respectively thereto. These recesses form seats for the axial cylindrical extensions $11^a$ of cylindrical blocks 11 of deformable material, preferably soft rubber, each of said blocks being of a size and shape to be received within the recesses $7^a$ and $8^a$ of the jaws 7 and 8, with their extensions $11^a$ seated in the recesses 9 and 10.

In Fig. 2, the parts constituting the coupling are shown in separated relation, but the mode of assembly will be readily understood. The shaft sections 1 and 2 being separated, as shown in Fig. 2, with the jaws on one of the members 3 or 4 out of register with the jaws on the other member, the blocks 11 are mounted on one of the members 3 or 4, with their extensions or trunnions $11^a$ in the recesses 9 or 10 provided therefor, after which the members 3 and 4 are brought together and the opposite trunnions on the blocks 11 are inserted into the recesses provided in the other coupling member 3 or 4. When so assembled, the coupling may have applied thereto a cylindrical cover 12 having an annular flange $12^a$ adapted to fit either of the hubs 5 or 6 and to be secured to the one to which it is applied.

With the parts constructed and arranged as described, it is believed that the operation will be readily understood. Assuming that the shaft section 1 is the driving section, its motion will be transmitted to the oher shaft section 2, through the blocks 11 and the jaws 7 and 8. Owing to the gaps provided between the adjacent inner ends of the faces of the jaws 7 and 8 as well as the gaps provided between the outer ends of such adjacent faces, the rubber blocks will be deformed and will provide a yeilding, shock-absorbing drive between the shaft sections, through their coupling members.

By virtue of the construction shown and described herein, it will be evident that I have produced a flexible coupling which is extremely simple of construction and which will constitute a self-cushioning device whereby the transmission of shocks from one of the shaft sections to the other will be greatly reduced. Furthermore, the connection as a whole is capable of long continued use without material deterioration; and, if necessary to replace the blocks 11, such replacement can be very quickly and conveniently effected.

In Fig. 7 there is shown a modification of the invention wherein it is contemplated that rubber balls, such as shown at 13, may be substituted for the cylindrical blocks 11. In this case, it will probably be preferable to form the surfaces $7^a$ and $8^a$ as spherical surfaces instead of cylindrical surfaces, it being necessary only to provide a sufficient clearance between the adjacent faces of the jaws 7 and 8 to permit of the deformation of the rubber balls through the pressure exerted thereupon in the operation of the coupling.

Having thus described my invention, what I claim is:—

1. A flexible coupling comprising a pair of members each provided with jaws, the jaws of the said members being of such angular extent as to permit the jaws on one member to be inserted between the jaws of the other member with a clearance between adjacent faces of such jaws, said members being provided with recesses adjacent to the ends of the jaws carried respectively thereby, and blocks of deformable material having reduced extensions adapted to be received in said recesses, with the bodies of the said blocks interposed between the adjacent ends of the jaws carried respectively by the said members.

2. A flexible coupling comprising a pair of members each provided with jaws, the jaws of the said members being of such angular extent as to permit the jaws on one member to be inserted between the jaws of the other member with a clearance between adjacent faces of such jaws, said members being provided with recesses adjacent to the ends of the jaws carried respectively thereby and each jaw having in the end thereof a cylindrical surface the axis of which coincides with the axis of the recess adjacent thereto, and blocks of deformable material interposed between the adjacent faces of the jaws carried by said members respectively, each of said blocks having a cylindrical outer surface adapted to be received within the cylindrical surfaces provided in such jaw faces and being provided with reduced extensions or trunnions adapted to be received in the said recesses.

In testimony whereof I hereunto affix my signature.

FREDERICK W. PETERS.